June 9, 1964     B. P. RAGSDALE     3,136,568
PACKING RING
Filed May 19, 1960
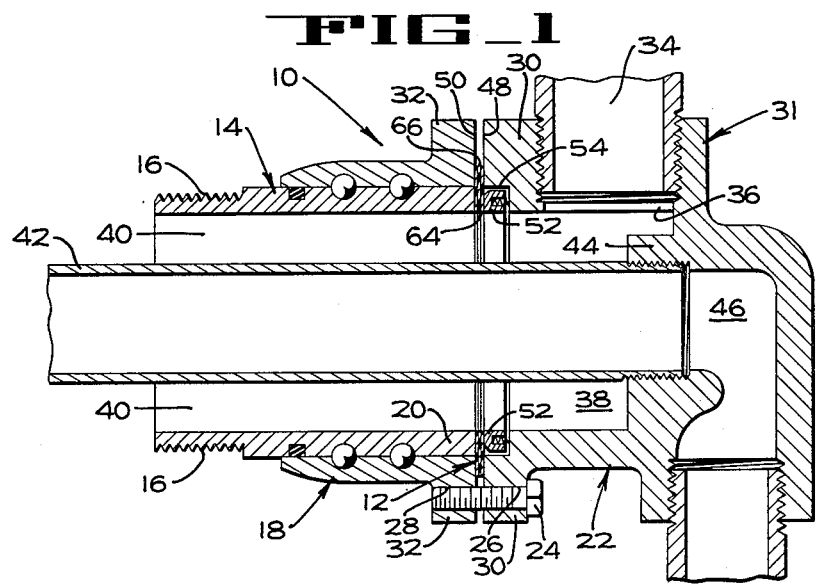
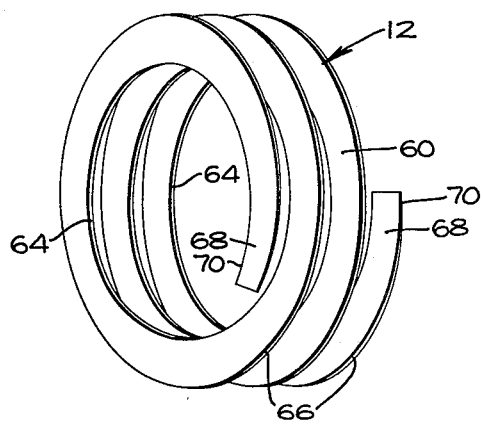
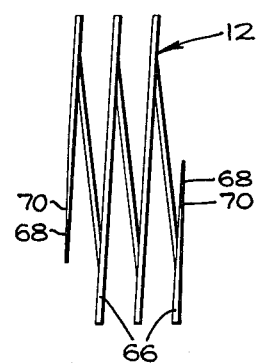
INVENTOR
BEVERLY P. RAGSDALE
BY *Hans G. Hoffmeister*
ATTORNEY

United States Patent Office 3,136,568
Patented June 9, 1964

3,136,568
PACKING RING
Beverly P. Ragsdale, Whittier, Calif., assignor, by mesne assignments, to FMC Corporation, San Jose, Calif., a corporation of Delaware
Filed May 19, 1960, Ser. No. 30,318
2 Claims. (Cl. 285—134)

The present invention pertains to fluid seals and gaskets, and more particularly relates to seal members for use in swivel pipe joints.

In many industries, such as the paper and textile manufacturing industries, a steam heated roll is used for drying certain products. In such a drying process, heat is transferred from the roll to the product to promote evaporation of moisture from the product. This results in reducing the temperature of the roll and condensing some of the steam therewithin into water. The condensate thus formed collects in the steam roll and should be removed to keep the steam roll operating at maximum efficiency. This removal is conventionally accomplished by means of a siphon tube incorporated in a rotating joint located at one end of the roll at the roll axis. The rotating joint serves to provide both a passage for steam entering the roll and an outlet conduit for the condensate formed in the roll. Since leakage of steam from the joint is objectionable, a seal is inserted between the relatively rotatable parts of the joint to prevent such leakage. Replacement of this seal normally requires the complete disassembly of the joint. Such replacement is usually a time consuming operation resulting in a costly shut down of an entire production line of which the roller is a component part.

An object of the present invention is to provide an improved sealing member, or packing ring.

Another object of the invention is to provide an improved replacement seal ring which can be installed without complete disassembly of the rotating joint, and without requiring disconnection of the swivel joint from either of the members rotatably interconnected thereby.

Another object is to provide an annular packing, or sealing member which is split so as to enable its installation upon a shaft whose ends are inaccessible and in which the split or cut is self-sealing when the sealing member is in operation.

These and other objects and advantages of the present invention will become apparent from the following description and the accompanying drawings, in which:

FIG. 1 is an axial section of a swivel joint incorporating the packing ring of the present invention.

FIG. 2 is a perspective of a packing ring embodying the principles of the present invention.

FIG. 3 is a side elevation of the packing ring shown in FIG. 2.

FIGURE 1 illustrates a well known type of swivel pipe joint 10, such as that commonly used in connection with a steam heated roller of an article drying machine (not shown). The packing ring 12 of the present invention is well adapted for, but is not necessarily limited to, use in swivel joints of this type as illustrated in FIG. 1. The swivel joint 10 comprises a tubular member 14 having an externally threaded end 16 for engagement with the hub of the drying roller (not shown) and a socket section 18 in which the other end 20 of the tubular member is rotatably carried. A body section 22 is secured to the socket section 18 by a plurality of cap screws 24 extending through circumferentially spaced clearance holes 26 in a flange 30 of the body section 22, and screwed into tapped holes 28 in a flange 32 of the socket section 18. Thus, the socket section 18 and the body section 22 together constitute the housing member 31 of the swivel joint 10, within which the tubular member 14 is rotatable.

A steam inlet passage 34 is provided in the joint 10 and consists of a lateral bore 36, and a connecting longitudinal bore 38 in the body section 22 opening into the interior 40 of the tubular member 14. A steam condensate discharge pipe or siphon tube 42 is disposed coaxially within the tubular member 14 and is spaced from the interior wall thereof. The pipe 42 also extends into the longitudinal bore 38 in coaxial relation therewith and is spaced from the interior wall thereof. The pipe 42 is fixed into position by being threadedly engaged within one end 44 of a discharge passage 46 formed in the body section 22.

The outer circumferential region of the packing ring 12 is clamped between the opposed faces 48 and 50 of the flanges 30 and 32, respectively, when the flanges are drawn together by tightening the bolts or cap screws 24, to form a static seal, or gasket to prevent leakage of steam through this connection. A spring urged pressure ring 52, disposed in a counterbore 54 in the face 48 of the flange 30, presses against the adjacent surface of the sealing member 12 to further insure sliding sealing engagement of the inner circumferential region of the sealing member with the inner end of the tubular member 14.

The seal 12 (FIGS. 2 and 3) comprises a narrow strip 60 of material such as "Teflon" or "Kel–F" of suitable, substantially uniform thickness. The strip 60 is a helix whose convolutions are axially thin and radially wide. The lateral edges of the strip constitute the inner and outer peripheral edges 64 and 66 of the annular seal 12; and since the strip 60 is of uniform width throughout its length, the inner and outer edges 64 and 66 of the seal 12 are concentric.

The opposite ends 68 of the strip 60 are feathered or tapered longitudinally thereof as shown at 70 (FIGS. 2 and 3) so that the axially facing ends of the annular seal 12 will present relatively uninterrupted surfaces for engagement by the faces 48 and 50 of the swivel joint 10 contacting the same. It should be noted that the feathered end portions of the helix are in overlapping relation with each other so that the installed seal is of substantially uniform thickness throughout its circumference.

In the installation of one of the seals 12 in the swivel joint 10, the cap screws 24 are first loosened, permitting the flanges 30 and 32 to be spaced from each other. One end 68 of the seal 12 is then inserted into the space between the flange faces 48 and 50 and hooked about the pipe 42. Thereafter, the part of the strip 60 still remaining outside the swivel joint is threaded into the joint 10 until it is completely coiled about the discharge pipe 42. The flanges 30 and 32 of the body section 22 and the socket section 18, respectively, are then interconnected by use of the cap screws 24 to clamp the outer circumferential region of the coil 12 between the flanges 30 and 32, with the inner circumferential region of the seal pressed into sliding, fluid sealing engagement with the inner end of the tubular member 14 by the pressure ring 52.

While a preferred embodiment of the present invention has been shown and described herein, various changes may be made therein without departing from the spirit of the invention as defined in the appended claims.

The invention having thus been described, what is claimed and desired to be protected by Letters Patent is:

1. A swivel coupling comprising a two part housing, a rotatable member in said housing, a fixed tube extending coaxially through said rotatable member, into and secured to said housing, a packing ring defined by a flat strip of plastic material in the form of a helix, each end of said strip being feathered to lie smoothly against the next adjacent convolution of the helix to provide the packing ring with flat end surfaces, said feathered ends being in overlapping relation with each other so that the packing ring is uniformly thick, the outer circumferential region of said ring being clamped between the two parts of said housing to provide a static seal therebetween, and the inner circumferential region of one of the end surfaces of the ring being in sliding engagement with the end of said rotatable member to provide a dynamic seal therewith, means to engage the other end surface of the inner circumferential region of said ring to act as a back-up to insure sliding, sealing engagement of said rotatable member with said ring, said strip being sufficiently flexible for the convolutions of the helix to be separated a distance sufficient to pass said fixed tube therebetween.

2. A swivel coupling comprising a two part housing, a rotatable member in said housing, a fixed tube extending coaxially through said rotatable member, into and secured to said housing, a packing ring defined by a flat strip of plastic material in the form of a helix, each end of said strip being dimensioned so as to lie against the next adjacent convolution of the helix to provide the packing ring with substantially flat end surfaces, the outer circumferential region of said ring being clamped between the two parts of said housing to provide a static seal therebetween, and the inner circumferential region of one of the end surfaces of said ring being in sliding engagement with the end of said rotatable member to provide a dynamic seal therewith, means to engage the other end surface of the inner circumferential region of said ring to act as a back-up to insure sliding, sealing engagement of said rotatable member with said ring, said plastic material being sufficiently flexible for the convolutions of the helix to be separated a distance sufficient for passage of said fixed tube therebetween.

References Cited in the file of this patent

UNITED STATES PATENTS

| | | |
|---|---|---|
| 1,165,084 | Flamming | Dec. 21, 1915 |
| 1,711,244 | Newton | Apr. 30, 1929 |
| 2,749,193 | Traub | June 5, 1956 |
| 2,760,794 | Hartranft | Aug. 28, 1956 |
| 2,809,080 | Mittell | Oct. 8, 1957 |
| 2,836,439 | Moore | May 27, 1958 |
| 2,927,805 | Faccou | Mar. 8, 1960 |